United States Patent

[11] 3,624,618

[72] Inventor Andrew James Lincoln
Concord, Mass.
[21] Appl. No. 690,469
[22] Filed Dec. 14, 1967
[45] Patented Nov. 30, 1971
[73] Assignee Sperry Rand Corporation

[54] A HIGH-SPEED MEMORY ARRAY USING VARIABLE THRESHOLD TRANSISTORS

6 Claims, 1 Drawing Fig.

[52] U.S. Cl. 340/173 R, 307/238, 307/304
[51] Int. Cl. G11c 11/34
[50] Field of Search 307/205, 238, 251, 279, 304; 340/173

[56] References Cited

UNITED STATES PATENTS 3,416,008 12/1968 Memelink et al. 307/238 X

*Primary Examiner*—Rodney D. Bennett, Jr.
*Assistant Examiner*—Daniel C. Kaufman
*Attorney*—S. C. Yeaton

ABSTRACT: A computer memory utilizing an array of variable threshold transistor memory cells for storing respective digital bit data. Each transistor is characterized by an electrically controllable conduction threshold which can be set to a binary value upon the application of a pulse voltage of respective polarity and sufficient amplitude across the gate electrode and substrate. The binary states of addressed transistors are sensed by applying a reference voltage having an amplitude intermediate the binary conduction thresholds simultaneously to the gate electrodes of every transistor in the array and then applying a pulsed voltage to the source and drain electrodes of the addressed transistors. The addressed transistors conduct if in state ONE and do not conduct if in state ZERO.

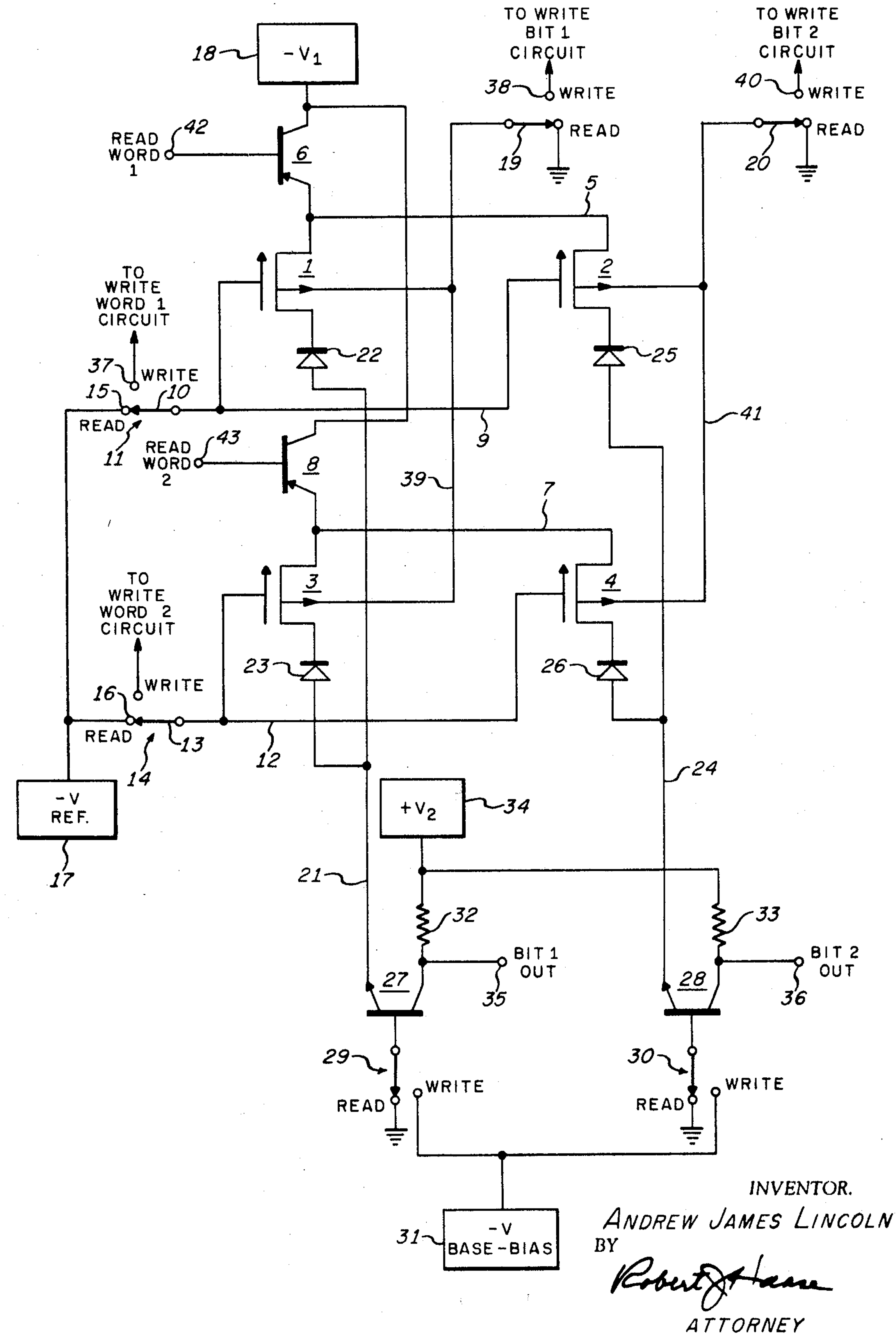
INVENTOR.
ANDREW JAMES LINCOLN
BY
Robert J. Haase
ATTORNEY

A HIGH-SPEED MEMORY ARRAY USING VARIABLE THRESHOLD TRANSISTORS

BACKGROUND OF THE INVENTION

Magnetic-tape drums and discs are well known to be capable of achieving high storage densities in a nonvolatile (nondestructive readout) computer memory. Such magnetic devices, however, are characterized by slow access rates and do not generally exhibit random access properties. Multiapertured cores are another form of nonvolatile storage device and are capable of achieving relatively high readout rates but they are expensive in that they are not amenable to integrated microcircuit fabrication techniques. Copending patent application Ser. No. 648,414 for "Electrically Alterable Non-Destructive Readout Field Effect Transistor Memory," now Pat. 3,508,211, filed June 23, 1967 in the name of Horst A. R. Wegener and assigned to the present assignee, describes a nonvolatile memory of high storage density, exhibiting high access rates and random access properties and being amenable to integrated microelectronic circuit fabrication techniques. However, the memory configuration disclosed in the aforementioned patent application is not suitable in some applications because of its medium speed readout characteristic. Readout speed is slowed by the fact that the gate electrode capacitance of each field effect transistor memory cell must be charged by the respective interrogation signal before the readout current begins to flow in the source-drain circuit representing the binary state of the memory cell.

The present invention makes use of the same transistor memory cells of the aforementioned copending patent application. Briefly, each memory cell is an insulated gate field effect transistor utilizing silicon nitride as the gate insulating material. The conduction threshold of the transistor is electrically alterable by impressing a voltage of suitable polarity between the gate electrode and the substrate having an amplitude in excess of a predetermined finite amount. The polarity of the voltage determines the sense in which the threshold is varied. Upon the application to the gate electrode of a voltage having a value intermediate the binary valued conduction thresholds and the application of appropriate source-drain potentials, the binary state of the transistor can be sensed by monitoring the magnitude of the resulting current flowing in the source-drain circuit. The amplitude of the sensing voltage is insufficient to change the preexisting conduction threshold so that non-destructive readout is achieved.

SUMMARY OF THE INVENTION

The present invention provides a computer memory comprising an array of electrically alterable conduction threshold transistors whose conduction thresholds may be set in any desired manner but preferably in the manner described in copending U.S. Pat. application Ser. No. 687,166, filed Dec. 1, 1967 in the name of Robert E. Oleksiak for "Variable Threshold Transistor Memory Using Pulse Coincident Writing" and assigned to the present assignee. In accordance with the present invention, the binary state of each transistor memory cell is sensed by first applying a reference voltage to the gate electrode of every transistor in the memory array and then by applying a pulsed voltage to the source-drain electrodes. The amplitude of the reference voltage is intermediate the binary conduction thresholds. Desired memory cells are set into state ONE by writing a conduction threshold with amplitude lower than that of the reference voltage. Other memory cells are set into binary state ZERO by writing a conduction threshold with amplitude higher than that of the reference voltage. Upon the application of the pulsed source-drain voltage, those cells in binary state ONE conduct source-drain current whereas those cells in binary state ZERO do not. The presence or absence of source-drain current, therefore, is a direct representation of binary states ONE and ZERO, respectively.

The application of the reference voltage to each gate electrode preconditions each memory cell for conduction so that source-drain current will begin to flow within a minimum time following the application of a source-drain interrogation pulse. If the interrogation pulse were applied instead to the gate electrode as in the case of the aforementioned copending U.S. Pat. application Ser. No. 648,414, readout would be delayed by the amount of time necessary to charge the gate electrode capacitance of each interrogated memory cell. By avoiding the necessity of charging the gate electrode capacitance at the time of interrogation of each memory cell, an increase of three orders of magnitude in the readout rate is achieved by the present invention.

BRIEF DESCRIPTION OF THE DRAWING

The sole FIGURE is a simplified schematic drawing of an illustrative embodiment of the invention comprising a memory of two words of two bits each.

DESCRIPTION OF THE PREFERRED EMBODIMENT

The memory represented by the sole FIGURE is useful in computing systems where it is necessary to retrieve stored data at a high rate and with random access without altering the stored data in the process of retrieving. Said memory is characterized by low power operation and compatibility with modern integrated microelectronic circuit fabrication techniques. Advantages include the capability of fabricating in very dense form with storage densities of the order $10^9$ bits per cubic inch and very fast readouts of 20 nanoseconds or less.

Referring to the FIGURE, the memory array comprises variable threshold transistors 1, 2, 3 and 4, each of which is represented by an arrow superimposed on the gate electrode. The four variable threshold transistors are arranged in two words of two bits each, transistors 1 and 2 representing the bits of one word and transistors 3 and 4 representing the bits of the other word. The source electrodes of transistors 1 and 2 are connected via line 5 to the emitter of read word driver 6. Similarly, the source electrodes of transistors 3 and 4 are connected via line 7 to the emitter of read-word driver 8. The collectors of read word drivers 6 and 8 are connected to a source 18 of negative voltage. The gate electrodes of transistors 1 and 2 are connected via line 9 to the movable arm 10 of read-write switch 11. Correspondingly, the gate electrodes of transistors 3 and 4 are connected via line 12 to the movable arm 13 of read-write switch 14. The fixed read contacts 15 and 16 of switches 11 and 14 are connected to negative voltage source 17.

The substrates of variable threshold transistors 1 and 3 are connected to the movable arm of switch 19 having one fixed contact connected to ground and the other fixed contact 38 connected to a circuit (not shown) for writing bit No. 1 of words 1 and 2. The substrates of transistors 2 and 4 are likewise connected to the movable arm of switch 20 having one fixed contact connected to ground and the other fixed contact 40 connected to a circuit (not shown) for writing bit No. 2 of words 1 and 2. The drain electrodes of transistors 1 and 3 are connected to line 21 via diodes 22 and 23, respectively. In like manner, the drain electrodes of transistors 2 and 4 are connected to line 24 by diodes 25 and 26, respectively. Lines 21 and 24 are connected to the emitters of respective sense amplifier transistors 27 and 28. The bases of transistors 27 and 28 are connected to the movable arms of respective switches 29 and 30 each having one fixed contact connected to ground and the other fixed contact connected to a source 31 of negative voltage. The collectors of transistors 27 and 28 are connected through respective resistors 32 and 33 to a source 34 of positive voltage. A signal representing the binary value of bit No. 1 of the addressed word and a signal representing the binary value of bit No. 2 of the addressed word are produced at output terminals 35 and 36, respectively.

Each of the variable threshold transistors 1, 2, 3 and 4 has the property that its turn-on (threshold) gate voltage can be set to a high value or to a low value in a substantially permanent but reversible manner by applying a large negative potential or a large positive potential between the gate electrode and the substrate. The manner in which the turn-on gate voltage is set forms no part of the present invention and for that reason the writing circuitry is not represented in the drawing. A preferred writing technique is disclosed in the aforementioned copending U.S. Pat. application Ser. No. 687,166. In the preferred case, switches 15, 16, 19, 20, 29 and 30 are set to their write positions. Assuming that word No. 1 is addressed, a square wave potential is applied to contact 37 of switch 11 and, via line 9 to the gate electrodes of transistors 1 and 2. Simultaneously, a potential of appropriate polarity is applied to contact 38 of switch 19 and, via line 39 to the substrates of transistors 1 and 3 while a potential of appropriate polarity is applied to terminal 40 of switch 20 and, via line 41, to the substrates of transistors 2 and 4. The polarity of the potentials applied to contacts 38 and 40 determines the kind of binary data (ONE or ZERO) desired to be written into bits No. 1 and No. 2, respectively, of the addressed word No. 1. The voltages applied to contacts 38 and 40 have an amplitude which is only half of that required to alter the conduction thresholds of the transistors of the addressed word. Similarly, the amplitude of the square wave applied to the gate electrodes of the transistors of the addressed word is only half the magnitude required for conduction threshold alteration. Alteration of the conduction threshold of each addressed transistor is achieved during that half cycle of the gate electrode square wave which is of opposite polarity to the substrate potential whereupon the difference between the gate and substrate voltages equals the magnitude required for threshold alteration. Thus, binary ZEROES and binary ONES are written into respective transistor memory cells during different portions of the writing cycle. Conduction threshold alteration occurs only in those memory cells where gate and substrate potentials coincide (transistors 1 and 2, in the example under discussion). Other memory cells (i.e., transistors 3 and 4) receive only one but not both of the gate and substrate potentials and are unaffected thereby, preserving the preexisting binary data (if any) everywhere in the memory other than in the memory cells comprising the addressed word. Diodes 22, 23, 25 and 26 are included in order to prevent spurious coupling of unaddressed transistors due to unwanted conduction paths. The negative voltage from source 31 which is applied to the bases of sense amplifiers 27 and 28 during the writing mode renders said transistors nonconductive and prevents spurious outputs at terminals 35 and 36.

In accordance with the present invention, the binary data stored in variable threshold transistors 1, 2, 3 and 4 is readout with minimum delay following the application of an interrogation pulse by setting all switches to the read position whereupon the negative voltage of source 17 is applied simultaneously to all the gate electrodes thereby preconditioning each of the transistors for conduction. The remaining conduction requirements are fulfilled upon the subsequent application of a pulsed voltage to the source-drain electrodes of the transistors of the addressed word. Said pulsed voltage is provided by source 18 and the appropriate read word driver 6 or 8. Source 18 is coupled to the sources of transistors 1 and 2 by the application of a pulsed read signal to terminal 42 at the base of transistor 6 in the event that word 1 is to be addressed. Source 18 is coupled to the source of transistors 3 and 4 by the application of a pulsed read signal to terminal 43 at the base of transistor 8 in the event that word 2 is to be addressed.

It should be especially noted that the capacitances associated with the gate electrodes of the transistors 1, 2, 3 and 4 are charged by the application of the reference potential of source 17 at the start of the read mode. Inasmuch as there is no significant capacitance associated with the source and drain electrodes of the transistors, the addressed transistors conduct within a minimum time upon the application of the interrogation voltage to the source-drain electrodes (of the order of 20 nanoseconds or less following the application of the interrogation pulse).

As previously mentioned, the amplitude of the reference voltage from source 17 is intermediate the conduction thresholds set into the memory cell transistors. The reference voltage will cause conduction of an addressed transistor if it is storing a ONE but will be insufficient to cause conduction if the addressed transistor is storing a ZERO. The flow of current through the addressed transistors in state ONE is sensed by the sense amplifier associated with the bit column of the matrix involved. For example, if transistor 1 is in state ONE, and word 1 is addressed by the application of a read signal to terminal 42, source-drain current flows through diode 22 to the emitter of sense amplifier 27 which is in condition for conduction by the grounded base connection established by switch 29. The conduction of amplifier 27 due to the sensing of transistor 1 in binary state ONE produces a current pulse across resistor 32 and an output signal at terminal 35. Thus, a sensed ONE at a given bit position of an addressed word is detected as a negative-going pulse at the collector resistor of the associated common base sense amplifier. A stored ZERO will be detected as the absence of such a pulse at readout time.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. In a computer memory utilizing an array of variable threshold transistor memory cells for storing respective digital bit data, each said transistor having source, drain and gate electrodes formed on a substrate, each said transistor being characterized by binary valued electrically controllable conduction thresholds established in accordance with respective voltages applied between said gate electrode and said substrate, means for reading binary bit data from each said transistor comprising a source of reference voltage having an amplitude intermediate said binary thresholds, means for applying said reference voltage simultaneously to said gate electrode of each said transistor, a source of pulsed voltage, and means for applying said pulsed voltage to the source and drain electrodes of addressed ones of said transistors.

2. In a computer memory utilizing an array of variable threshold transistor memory cells for storing respective digital bit data, each said transistor having source, drain and gate electrodes formed on a substrate, each said transistor being characterized by binary valued electrically controllable conduction thresholds established in accordance with respective voltages applied between said gate electrode and said substrate, means for reading binary bit data from each said transistor comprising a source of reference voltage having an amplitude intermediate said binary thresholds, means for applying said reference voltage simultaneously to said gate electrode of each said transistor, said means for applying said reference voltage including means for selectively coupling said source of reference voltage to the gate electrode of each said transistor during the reading mode of said memory only, a source of pulsed voltage, and means for applying said pulsed voltage to the source and drain electrodes of addressed ones of said transistors.

3. In a computer memory utilizing an array of variable threshold transistor memory cells for storing respective digital bit data, each said transistor having source, drain and gate electrodes formed on a substrate, each said transistor being characterized by binary valued electrically controllable conduction thresholds established in accordance with respective voltages applied between said gate electrode and said substrate, means for reading binary bit data from each said transistor comprising a source of reference voltage having an amplitude intermediate said binary thresholds, means for applying said reference voltage simultaneously to said gate electrode of each said transistor, a source of pulsed voltage, means for applying said pulsed voltage to the source and drain electrodes of addressed ones of said transistors, and means coupled to said addressed transistors for sensing the amount of source-drain current resulting from the application of said pulsed voltage to the source and drain electrodes of said addressed transistors.

4. The apparatus as defined in claim 3 and further including means for deactuating said means for sensing during the writing mode of said memory.

5. The apparatus as defined in claim 1 and further including diode means connected in the source-drain circuit of each said transistor for isolating the source-drain circuits of said transistors from each other.

6. The apparatus as defined in claim 1 and further including voltage means selectively coupled to the gate electrode and substrate of each said transistor for altering the conduction thresholds thereof.

* * * * *